(12) United States Patent
Kotra et al.

(10) Patent No.: US 11,653,032 B2
(45) Date of Patent: May 16, 2023

(54) VIDEO PROCESSING METHOD, VIDEO PROCESSING APPARATUS, ENCODER, DECODER, MEDIUM AND COMPUTER PROGRAM

(71) Applicant: HUAWEI TECHNOLOGIES CO., LTD., Shenzhen (CN)

(72) Inventors: Anand Meher Kotra, Munich (DE); Semih Esenlik, Munich (DE); Jianle Chen, Santa Clara, CA (US); Biao Wang, Munich (DE); Han Gao, Munich (DE); Zhijie Zhao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/994,554

(22) Filed: Aug. 15, 2020

(65) Prior Publication Data
US 2020/0404342 A1 Dec. 24, 2020

Related U.S. Application Data

(63) Continuation of application No. PCT/CN2019/100226, filed on Aug. 12, 2019.
(Continued)

(51) Int. Cl.
*H04N 19/52* (2014.01)
*H04N 19/96* (2014.01)
*H04N 19/172* (2014.01)

(52) U.S. Cl.
CPC .......... *H04N 19/96* (2014.11); *H04N 19/172* (2014.11); *H04N 19/52* (2014.11)

(58) Field of Classification Search
CPC .............. H04N 19/103; H04N 19/105; H04N 19/109; H04N 19/172; H04N 19/174;
(Continued)

(56) References Cited

U.S. PATENT DOCUMENTS

| 2014/0286427 | A1 | 9/2014 | Fukushima et al. |
| 2017/0094271 | A1* | 3/2017 | Liu .................. H04N 19/513 |

(Continued)

FOREIGN PATENT DOCUMENTS

| CA | 3105379 A1 | 1/2020 |
| CN | 106464896 A | 2/2017 |

(Continued)

OTHER PUBLICATIONS

Zhang, Li et al., "CE4-related: History-based Motion Vector Prediction", Joint Video Experts Team (JVET) of ITU-T SG 16 WP 3 and ISO/IEC JTC 1/SC 29/WG 11 11th Meeting, JVET-K0104-v1, 11th Meeting: Ljubljana, SI, Jul. 10-18, 2018, total 8 pages.
(Continued)

*Primary Examiner* — Anner N Holder
(74) *Attorney, Agent, or Firm* — Maier & Maier, PLLC

(57) ABSTRACT

A video processing method, comprising: initializing a HMVP list for a current CTU row when the current CTU is the beginning CTU of a current CTU row; and processing the current CTU row based on the HMVP list. By performing the method, the encoding efficiency and decoding efficiency are improved.

16 Claims, 7 Drawing Sheets

Related U.S. Application Data

(60) Provisional application No. 62/717,004, filed on Aug. 10, 2018.

(58) Field of Classification Search
CPC .... H04N 19/176; H04N 19/436; H04N 19/52; H04N 19/96
See application file for complete search history.

(56) References Cited

U.S. PATENT DOCUMENTS

| | | | |
|---|---|---|---|
| 2017/0127086 A1 | 5/2017 | Lai et al. | |
| 2018/0109786 A1 | 4/2018 | Kim et al. | |
| 2020/0336755 A1* | 10/2020 | Lai | H04N 19/172 |
| 2020/0382770 A1* | 12/2020 | Zhang | H04N 19/513 |
| 2021/0136405 A1* | 5/2021 | Chen | H04N 19/42 |
| 2021/0218957 A1* | 7/2021 | Jang | H04N 19/132 |

FOREIGN PATENT DOCUMENTS

| | | | | |
|---|---|---|---|---|
| JP | 2021-516514 A | 7/2021 | | |
| RU | 2624560 C2 | 7/2017 | | |
| RU | 2752644 C1 | 7/2021 | | |
| WO | 2015090219 A1 | 6/2015 | | |
| WO | 2020/014389 A1 | 1/2020 | | |
| WO | 2020/018241 A1 | 1/2020 | | |
| WO | WO-2020018486 A1 * | 1/2020 | | H04N 19/52 |
| WO | 2020071829 A1 | 4/2020 | | |

OTHER PUBLICATIONS

Park, Naeri et al., "CE4-related: History-Based Motion Vector Prediction considering parallel processing", Joint Video Experts Team (JVET) of ITU-T SG 16 WP 3 and ISO/IEC JTC 1/SC 29/WG 11 12th Meeting, JVET-L0158, 12th Meeting: Macau, CN, Oct. 8-12, 2018, total 9 pages.

Chen, Yiwen et al., "CE4-related: Modified History-based MVP to support parallel processing", Joint Video Experts Team (JVET) of ITU-T SG 16 WP 3 and ISO/IEC JTC 1/SC 29/WG 11 12th Meeting, JVET-L0106, 12th Meeting: Macao, CN, Oct. 3-12, 2018, total 3 pages.

Kotra, A. M. et al., "CE4-related: HMVP and parallel processing with tiles and tile groups", Joint Video Experts Team (JVET) of ITU-T SG 16 WP 3 and ISO/IEC JTC 1/SC 29/WG 11 13th Meeting, JVET-M0300-v3, 13th Meeting: Marrakech, MA, Jan. 9-18, 2019, total 3 pages.

V. Sze et al. 5.2.2 Inter-picture Prediction Block Merging, High Efficiency Video Coding (HEVC), Algorithms and Architectures, 2014. total 8 pages.

V. Sze et al. 3.3.2.2 Wavefront Parallel Processing (WPP), High Efficiency Video Coding (HEVC), Algorithms and Architectures, 2014. total 3 pages.

Haitao Yang et al. "Description of Core Experiment 4 (CE4): Inter prediction and motion vector coding." Joint Video Experts Team (JVET) of ITU-T SG 16 WP 3 and ISO/IEC JTC 1/SC 291WG 11. 11th Meeting: Ljubljana, SI. Jul. 10-18, 2018. 45 pages.

Yi-Wen Chen et al. "CE4-related: Modified History-based MVP to support parallel processing." Joint Video Experts Team (JVET) of ITU-T SG 16 WP 3 and ISO/IEC JTC 1/SC 29/WG 11. 12th Meeting: Macao, CN. Oct. 3-12, 2018. 3 pages.

Anand Meher Kotra et al. "CE4-related: HMVP and parallel processing with tiles and tile groups." Joint Video Experts Team (JVET) of ITU-T SG 16 WP 3 and I50/IEC JTC 1/SC 29/WG 11. 13th Meeting: Marrakech, MA. Jan. 9-18, 2019. 3 pages.

Li Zhang et al. "CE4-related: History-based Motion Vector Prediction." Joint Video Experts Team (JVET) of ITU-T SG 16 WP 3 and ISO/IEC JTC 1/SC 29/WG 11. 11th Meeting: Ljubljana, SI. Jul. 10-18, 2018. 5 pages.

Li Zhang et al. "History-based Motion Vector Prediction in Versatile Video Coding." 2019 Data Compression Conference (DCC). 10 pages.

Li Zhang et al.,"CE4-related: History-based Motion Vector Prediction", Joint Video Experts Team (JVET) of ITU-T SG 16 WP 3 and ISO/IEC JTC 1/SC 29/WG 11, Document: JVET-K0104-v5, 11th Meeting: Ljubljana, SI. Jul. 10-18, 2018, total 8 pages.

Haitao Yang et al,"Description of Core Experiment 4 (CE4): Inter prediction and motion vector coding", Joint Video Experts Team (JVET) of ITU-T SG 16 WP 3 and ISO/IEC JTC 1/SC 291WG 11, Document: JVET-K1024-v3, 11th Meeting: Ljubljana, SI, Jul. 10-18, 2018, total 45 pages.

* cited by examiner

VIDEO PROCESSING METHOD, VIDEO PROCESSING APPARATUS, ENCODER, DECODER, MEDIUM AND COMPUTER PROGRAM

CROSS-REFERENCE TO RELATED APPLICATIONS

This application is a continuation of International Application No. PCT/CN2019/100226, filed on Aug. 12, 2019, which claims priority to United States of American Provisional Patent Application No. 62/717,004, filed on Aug. 10, 2018. The disclosures of the aforementioned applications are hereby incorporated by reference in their entireties.

TECHNICAL FIELD

Embodiments of the present disclosure generally relate to the field of video coding and more particularly to a video processing method, a video processing apparatus, an encoder, a decoder, a medium and a computer program.

BACKGROUND

Video coding (video encoding and decoding) is used in a wide range of digital video applications, for example broadcast digital TV, video transmission over internet and mobile networks, real-time conversational applications such as video chat, video conferencing, Digital Versatile Disc (DVD) and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. Further video coding standards comprise Moving Picture Experts Group-1 (MPEG-1) video, MPEG-2 video, Telecommunication Standardization Sector of the International Telecommunications Union (ITU-T) H.262/MPEG-2, ITU-T H.263, ITU-T H.264/MPEG-4, Part 10, Advanced Video Coding (AVC), ITU-T H.265/High Efficiency Video Coding (HEVC), ITU-T H.266/Versatile video coding (VVC) and extensions, e.g. scalability and/or three-dimensional (3D) extensions, of these standards. As the video creation and use have become more and more ubiquitous, video traffic is the biggest load on communication networks and data storage, accordingly, one of the goals of most of the video coding standards was to achieve a bitrate reduction compared to its predecessor without sacrificing picture quality. Even the latest High Efficiency video coding (HEVC) can compress video about twice as much as AVC without sacrificing quality. and there is a need to further compress videos compared with HEVC.

SUMMARY

Embodiments of the present application provide a video processing method and a corresponding apparatus, so as to improve coding efficiency.

The foregoing and other objects are achieved by the subject matter of the independent claims. Further implementation forms are apparent from the dependent claims, the description and the figures.

A first aspect of the present invention provides a video processing method, comprising: initializing a history-based motion vector prediction (HMVP) list for a current coding tree unit (CTU) row when the current CTU is the beginning CTU of a current CTU row; and processing the current CTU row based on the HMVP list. The beginning CTU may also be referred to as starting CTU and is the first CTU of the CTUs of the same CTU row which is processed.

It can be seen that the HMVP list for the current CTU row is initialized at the beginning for processing the current CTU row, the process of the current CTU row does not need to base on an HMVP list of a previous CTU row, and thus can improve the encoding efficiency and the decoding efficiency.

With reference to the first aspect, in a first possible implementation manner of the first aspect, the quantity of the candidate motion vectors in the initialized HMVP list is zero.

With reference to the first aspect of or any one of the aforementioned implementation manners of the first aspect, in a second possible implementation manner of the first aspect, the current CTU row belongs to a picture area that consists of a plurality of CTU rows, and the current CTU row is any one of the plurality of CTU rows, e.g. the first (e.g. top) CTU row, the second CTU row, ... and the last (e.g. bottom) CTU row of the picture area.

With reference to the first aspect of or any one of the aforementioned implementation manners of the first aspect, in a third possible implementation manner of the first aspect, the method further comprises: initializing a HMVP list for each of the plurality of CTU rows except the current CTU row, wherein HMVP lists for the plurality of CTU rows are identical or different. In other words, embodiments may additionally initialize HMVP lists for all other CTU rows of the picture area, i.e. may initialize HMVP lists for all CTU rows of the picture area.

With reference to the first aspect of or any one of the aforementioned implementation manners of the first aspect, in a fourth possible implementation manner of the first aspect, the processing the current CTU row based on the HMVP list comprises: processing the current CTU of the current CTU row; updating the initialized HMVP list based on the processed current CTU; and processing the second CTU of the current CTU row based on the updated HMVP list.

With reference to the first aspect of or any one of the aforementioned implementation manners of the first aspect, in a fifth possible implementation manner of the first aspect, the HMVP list is updated according to a processed CTU of the current CTU row.

With reference to the first aspect of or any one of the aforementioned implementation manners of the first aspect, in a sixth possible implementation manner of the first aspect, the HMVP list for the current CTU row is initialized as follows: emptying the HMVP list for the current CTU row.

With reference to the first aspect of or any one of the aforementioned implementation manners of the first aspect, in a seventh possible implementation manner of the first aspect, the processing the current CTU row based on the HMVP list comprises: processing the current CTU row based on the HMVP list from the second CTU of the current CTU row, wherein the second CTU is adjacent to the beginning CTU.

With reference to the first aspect of or any one of the aforementioned implementation manners of the first aspect, in an eighth possible implementation manner of the first aspect, the plurality of CTU rows are processed in wavefront parallel processing (WPP) mode.

It can be seen that, as the HMVP list for the current CTU row is initialized at the beginning for processing the current CTU row, when combining with WPP mode, the CTU rows of a picture frame or a picture area can be processed in parallel, and thus can further improve encoding efficiency and decoding efficiency.

With reference to the first aspect of or any one of the afore mentioned implementation manners of the first aspect, in a ninth possible implementation manner of the first aspect, current CTU row is begin to be processed (or the processing of the current CTU row begins) when a particular CTU of a previous CTU row is processed.

With reference to the first aspect of or any one of the afore mentioned implementation manners of the first aspect, in a tenth possible implementation manner of the first aspect, the previous CTU row is the CTU row immediately adjacent to the current CTU row and on top of or above the current CTU row.

With reference to the ninth implementation manner of the first aspect of or the tenth implementation manner of the first aspect, in a eleventh possible implementation manner of the first aspect, the particular CTU of the previous CTU row is the second CTU of the previous CTU row; or the particular CTU of the previous CTU row is the first CTU of the previous CTU row.

A second aspect of the present invention provides a video processing apparatus, comprising: an initializing unit, configured to initialize a history-based motion vector prediction (HMVP) list for a current coding tree unit (CTU) row when the current CTU is the beginning CTU of a current CTU row; and a processing unit, configured to process the current CTU row based on the HMVP list.

With reference to the second aspect of, in a first possible implementation manner of the second aspect, the quantity of the candidate motion vectors in the initialized HMVP list is zero.

With reference to the second aspect of or any one of the afore mentioned implementation manners of the second aspect, in a second possible implementation manner of the second aspect, the current CTU row belongs to a picture area that consists of a plurality of CTU rows, and the current CTU row is any one of the plurality of CTU rows.

With reference to the second aspect of or any one of the afore mentioned implementation manners of the second aspect, in a third possible implementation manner of the second aspect, the initializing unit is further configured to initialize a HMVP list for each of the plurality of CTU rows except the current CTU row, wherein HMVP lists for the plurality of CTU rows are identical or different.

With reference to the second aspect of or any one of the afore mentioned implementation manners of the second aspect, in a fourth possible implementation manner of the second aspect, the processing unit is further configured to: process the current CTU of the current CTU row; update the initialized HMVP list based on the processed current CTU; and process the second CTU of the current CTU row based on the updated HMVP list.

With reference to the second aspect of or any one of the afore mentioned implementation manners of the second aspect, in a fifth possible implementation manner of the second aspect, the HMVP list is updated according to a processed CTU of the current CTU row.

With reference to the second aspect of or any one of the afore mentioned implementation manners of the second aspect, in a sixth possible implementation manner of the second aspect, the initializing unit is further configured to initialize the HMVP list for the current CTU row as follows: empty the HMVP list for the current CTU row.

With reference to the second aspect of or any one of the afore mentioned implementation manners of the second aspect, in a seventh possible implementation manner of the second aspect, the processing unit is further configured to process the current CTU row based on the HMVP list as follows: process the current CTU row based on the HMVP list from the second CTU of the current CTU row, wherein the second CTU is adjacent to the beginning CTU.

With reference to the second aspect of or any one of the afore mentioned implementation manners of the second aspect, in an eighth possible implementation manner of the second aspect, the plurality of CTU rows are processed in wavefront parallel processing (WPP) mode.

With reference to the second aspect of or any one of the afore mentioned implementation manners of the second aspect, in a ninth possible implementation manner of the second aspect, the current CTU row is begin to be processed (or the processing of the current CTU row begins) when a particular CTU of a previous CTU row is processed.

With reference to the second aspect of or any one of the afore mentioned implementation manners of the second aspect, in a tenth possible implementation manner of the second aspect, the previous CTU row is the CTU row immediately adjacent to the current CTU row and on the top of the current CTU row.

With reference to the ninth implementation manner of the second aspect of or the tenth implementation manner of the second aspect, in an eleventh possible implementation manner of the second aspect, the particular CTU of the previous CTU row is the second CTU of the previous CTU row; or the particular CTU of the previous CTU row is the first CTU of the previous CTU row.

A third aspect of the present invention provides a method of coding implemented by a decoding device, comprising: constructing/initializing a HMVP list for a current CTU row; and processing a CTU of the current CTU row based on the constructed/initialized HMVP list. With reference to the third aspect, in a first possible implementation manner of the third aspect, the HMVP list for the current CTU row is constructed/initialized as follows: emptying the HMVP list for the current CTU row; and/or setting default values for the HMVP list for the current CTU row; and/or constructing/initializing the HMVP list for the current CTU row based on a HMVP list of a CTU of a previous CTU row.

With reference to the first possible implementation manner of the third aspect, in a second possible implementation manner of the third aspect, the setting default values for the HMVP list for the current CTU row comprises: populating a MV of the HMVP list as a MV of Uni-prediction manner, wherein the MV of Uni-prediction manner is either a zero motion vector or not a zero motion vector, wherein reference pictures comprises the first reference picture in L0 list; and/or populating a MV of the HMVP list as a MV of Bi-prediction manner, wherein the MV of Bi-prediction manner is either a zero motion vector or not a zero motion vector, wherein reference pictures comprises the first reference picture in L0 list and the first reference picture in L1 list.

With reference to the first possible implementation manner of the third aspect, in a third possible implementation manner of the third aspect, each co-located picture may store a temporal HMVP list for each CTU row or for the whole picture, wherein the setting default values for the HMVP list for the current CTU row comprises: initializing/constructing the HMVP list for the current CTU row based on the temporal HMVP list.

With reference to the first possible implementation manner of the third aspect, in a fourth possible implementation manner of the third aspect, the previous CTU row is the CTU row immediately adjacent to the current CTU row and on the top of the current CTU row.

With reference to the fourth possible implementation manner of the third aspect, in a fifth possible implementation manner of the third aspect, the CTU of the previous CTU row is the second CTU of the previous CTU row.

With reference to the fourth possible implementation manner of the third aspect, in a fifth possible implementation manner of the third aspect, the CTU of the previous CTU row is the first CTU of the previous CTU row.

A fourth aspect of the present invention provides a method of coding implemented by an encoding device, comprising: constructing/initializing a HMVP list for a current CTU row; processing a CTU of the current CTU row based on the constructed/initialized HMVP list.

With reference to the fourth aspect, in a first possible implementation manner of the fourth aspect, the HMVP list for the current CTU row is constructed/initialized as follows: emptying the HMVP list for the current CTU row; and/or setting default values for the HMVP list for the current CTU row; and/or constructing/initializing the HMVP list for the current CTU row based on a HMVP list of a CTU of a previous CTU row.

With reference to the first possible implementation manner of the fourth aspect, in a second possible implementation manner of the fourth aspect, the setting default values for the HMVP list for the current CTU row comprises: populating a MV of the HMVP list as a MV of Uni-prediction manner, wherein the MV of Uni-prediction manner is either a zero motion vector or not a zero motion vector, wherein reference pictures comprises the first reference picture in L0 list; and/or populating a MV of the HMVP list as a MV of Bi-prediction manner, wherein the MV of Bi-prediction manner is either a zero motion vector or not a zero motion vector, wherein reference pictures comprises the first reference picture in L0 list and the first reference picture in L1 list.

With reference to the first possible implementation manner of the fourth aspect, in a third possible implementation manner of the fourth aspect, each co-located picture may store a temporal HMVP list for each CTU row or for the whole picture, wherein the setting default values for the HMVP list for the current CTU row comprises: initializing/constructing the HMVP list for the current CTU row based on the temporal HMVP list.

With reference to the first possible implementation manner of the fourth aspect, in a fourth possible implementation manner of the fourth aspect, the previous CTU row is the CTU row immediately adjacent to the current CTU row and on top of or above the current CTU row.

With reference to the fourth possible implementation manner of the fourth aspect, in a fifth possible implementation manner of the fourth aspect, the CTU of the previous CTU row is the second CTU of the previous CTU row.

With reference to the fourth possible implementation manner of the fourth aspect, in a sixth possible implementation manner of the fourth aspect, the CTU of the previous CTU row is the first CTU of the previous CTU row.

A fifth aspect of the present invention provides an encoder comprising processing circuitry for carrying out the method according to the first aspect or any one of the implementation manners of the first aspect, or according to the third aspect or any one of the implementation manners of the third aspect, or according to the fourth aspect or any one of the implementation manners of the fourth aspect. E.g., the encoder may include an initializing circuitry configured to initialize a history-based motion vector prediction (HMVP) list for a current coding tree unit (CTU) row when the current CTU is the beginning CTU of a current CTU row; and a processing circuitry configured to process the current CTU row based on the HMVP list.

A sixth aspect of the present invention provides a decoder comprising processing circuitry for carrying out the method according to the first aspect or any one of the implementation manners of the first aspect, or according to the third aspect or any one of the implementation manners of the third aspect, or according to the fourth aspect or any one of the implementation manners of the fourth aspect. E.g., the decoder may include an initializing circuitry configured to initialize a history-based motion vector prediction (HMVP) list for a current coding tree unit (CTU) row when the current CTU is the beginning CTU of a current CTU row; and a processing circuitry configured to process the current CTU row based on the HMVP list.

A seventh aspect of the present invention provides a computer program product comprising a program code for performing the method according to the first aspect or any one of the implementation manners of the first aspect, or according to the third aspect or any one of the implementation manners of the third aspect, or according to the fourth aspect or any one of the implementation manners of the fourth aspect.

A eighth aspect of the present invention provides a computer-readable storage medium storing computer instructions, that when executed by one or more processors, cause the one or more processors to perform the method according to the first aspect or any one of the implementation manners of the first aspect, or according to the third aspect or any one of the implementation manners of the third aspect, or according to the fourth aspect or any one of the implementation manners of the fourth aspect.

A ninth aspect of the present invention provides a decoder, comprising: one or more processors; and a non-transitory computer-readable storage medium coupled to the processors and storing programming for execution by the processors, wherein the programming, when executed by the processors, configures the decoder to carry out the method according to the first aspect or any one of the implementation manners of the first aspect, or according to the third aspect or any one of the implementation manners of the third aspect, or according to the fourth aspect or any one of the implementation manners of the fourth aspect.

A tenth aspect of the present invention provides an encoder, comprising: one or more processors; and a non-transitory computer-readable storage medium coupled to the processors and storing programming for execution by the processors, wherein the programming, when executed by the processors, configures the encoder to carry out the method according to the first aspect or any one of the implementation manners of the first aspect, or according to the third aspect or any one of the implementation manners of the third aspect, or according to the fourth aspect or any one of the implementation manners of the fourth aspect.

BRIEF DESCRIPTION OF THE DRAWINGS

In the following embodiments of the invention are described in more detail with reference to the attached figures and drawings, in which.

Figure 1A:
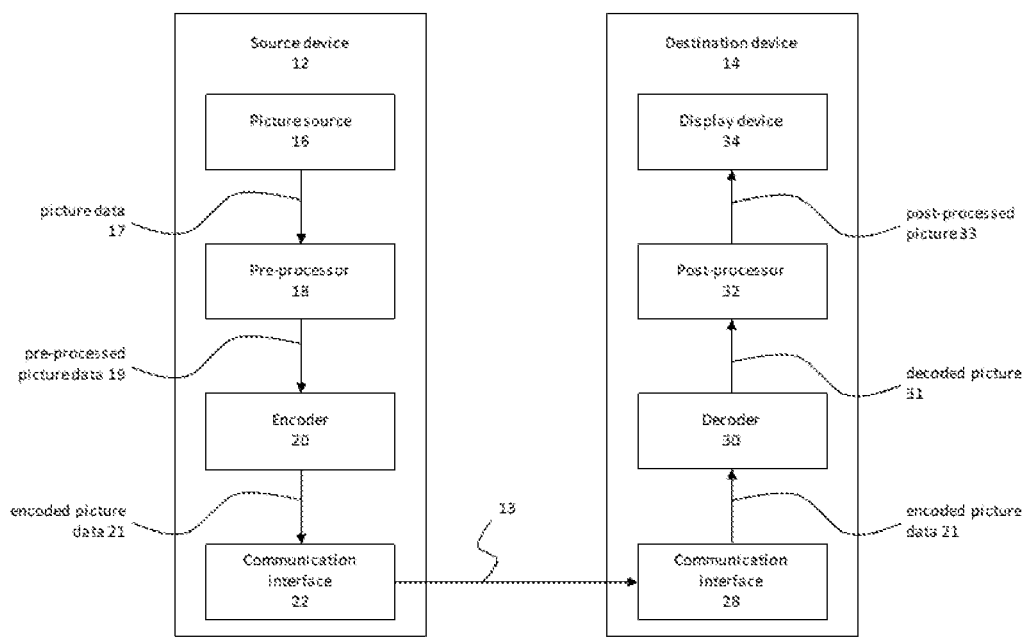
FIG. 1A is a block diagram showing an example of a video coding system configured to implement embodiments of the invention.

In the following identical reference signs refer to identical or at least functionally equivalent features if there is no specific note regarding to the difference of those identical reference signs.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for video sequence. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Qual-tree and binary tree (QTBT) partitioning frame is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

In the following embodiments of an encoder 20, a decoder 30 and a coding system 10 are described based on FIGS. 1 to 3.

FIG. 1A is a conceptional or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1A, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:
  If separate_colour_plane_flag is equal to 0, each of the two chroma arrays has the same height and width as the luma array;
  Otherwise (separate_colour_plane_flag is equal to 1), the three colour planes are separately processed as monochrome sampled pictures.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2 or FIG. 4).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g. a video encoder 20) and the decoder 30 (e.g. a video decoder 30) each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

It should be understood that, for each of the above examples described with reference to video encoder 20, video decoder 30 may be configured to perform a reciprocal process. With regard to signaling syntax elements, video decoder 30 may be configured to receive and parse such syntax element and decode the associated video data accordingly. In some examples, video encoder 20 may entropy encode one or more syntax elements into the encoded video bitstream. In such examples, video decoder 30 may parse such syntax element and decode the associated video data accordingly.

Figure 1B:
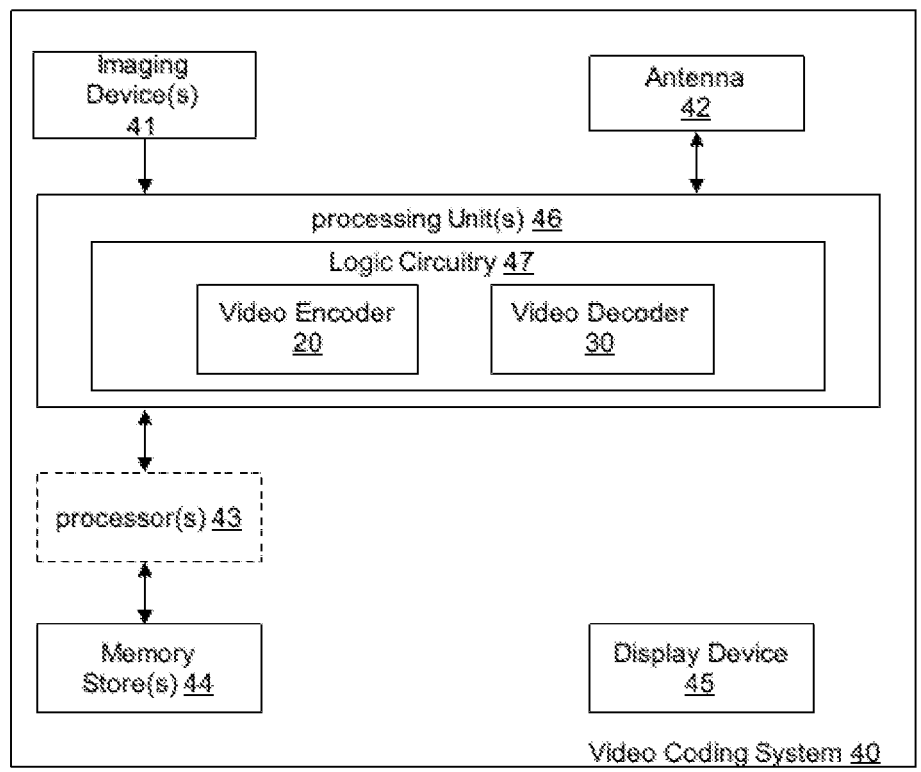
FIG. 1B is a block diagram showing another example of a video coding system configured to implement embodiments of the invention.
Figure 2:
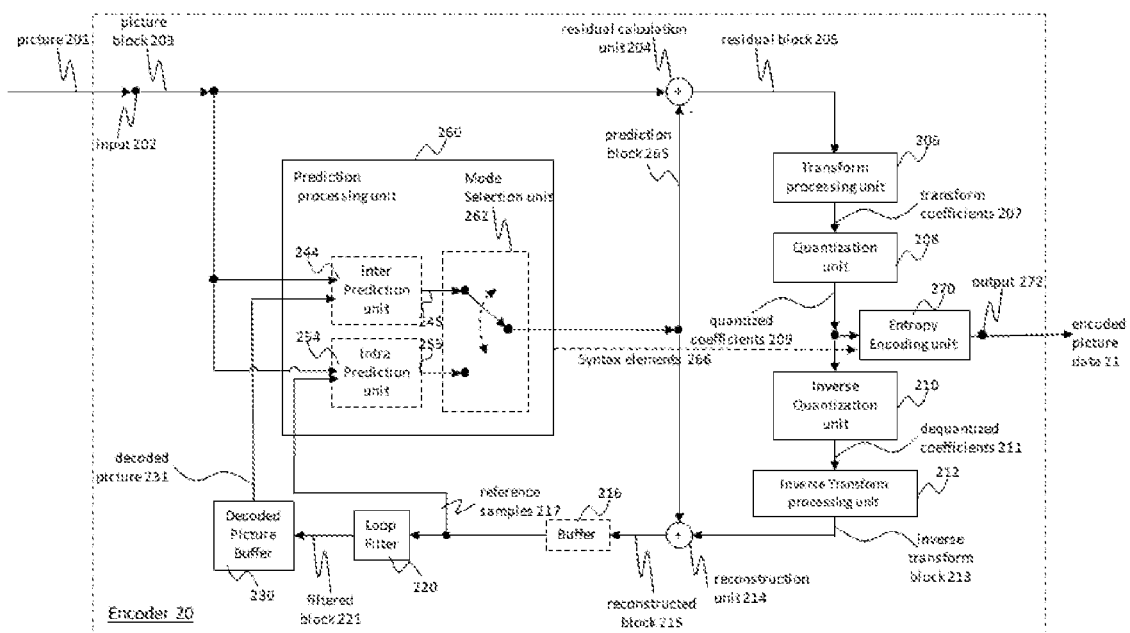
FIG. 2 is a block diagram showing an example of a video encoder configured to implement embodiments of the invention.
Figure 3:
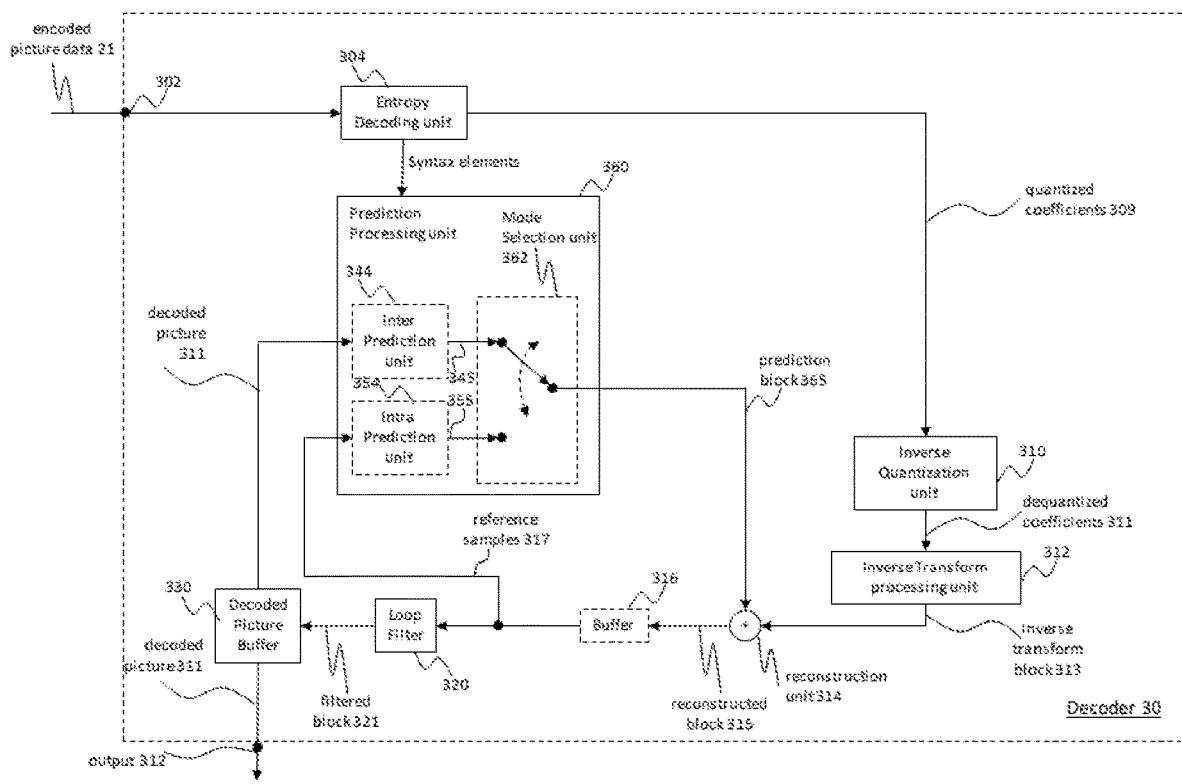
FIG. 3 is a block diagram showing an example structure of a video decoder configured to implement embodiments of the invention.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 100 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 100 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

Encoder & Encoding Method

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 20 may comprise a partitioning unit (not depicted in FIG. 2) configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In one example, the prediction processing unit 260 of video encoder 20 may be configured to perform any combination of the partitioning techniques described above.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 20 as shown in FIG. 2 is configured encode the picture 201 block by block, e.g. the encoding and prediction is performed per block 203.

Residual Calculation

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 30 (and the corresponding inverse transform, e.g. by inverse transform processing unit 212 at an encoder 20) and corresponding scaling factors for the forward transform, e.g. by transform processing unit 206, at an encoder 20 may be specified accordingly.

Quantization

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g. Summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 20 may be configured such that, e.g. the buffer unit 216 is not only used for storing the reconstructed blocks 215 for intra prediction 254 but also for the loop filter unit 220 (not shown in FIG. 2), and/or such that, e.g. the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 20 (respectively loop filter unit 220) may be configured to output loop filter parameters (such as sample adaptive offset information), e.g. directly or entropy encoded via the entropy encoding unit 270 or any other entropy coding unit, so that, e.g., a decoder 30 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 20 will be explained in more detail.

As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit (not shown in FIG. 2) and motion compensation (MC) unit (not shown in FIG. 2). The motion estimation unit is configured to receive or obtain the picture block 203 (current picture block 203 of the current picture 201) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV).

The motion compensation unit is configured to obtain, e.g. receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 30 in decoding the picture blocks of the video slice.

The intra prediction unit 254 is configured to obtain, e.g. receive, the picture block 203 (current picture block) and one or a plurality of previously reconstructed blocks, e.g. reconstructed neighbor blocks, of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g. minimum residual (e.g. the intra-prediction mode providing the prediction block 255 most similar to the current picture block 203) or minimum rate distortion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 3 shows an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 311, e.g. via output 312, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
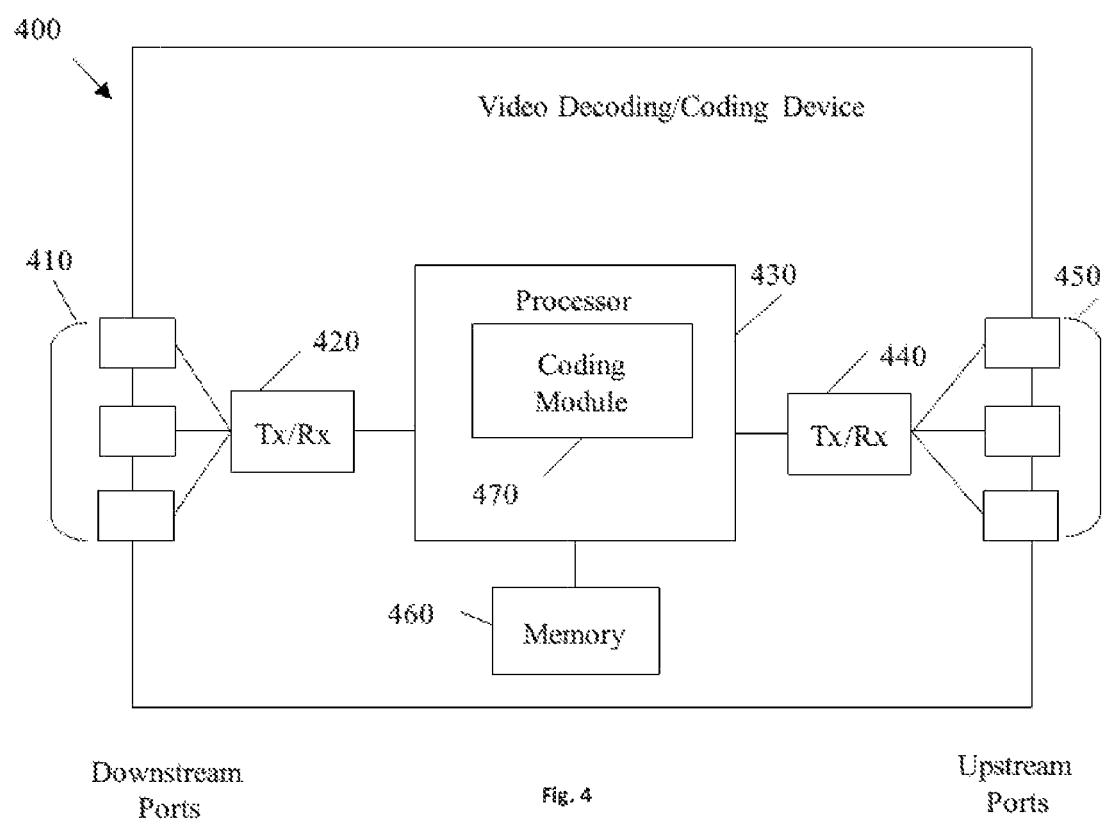
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
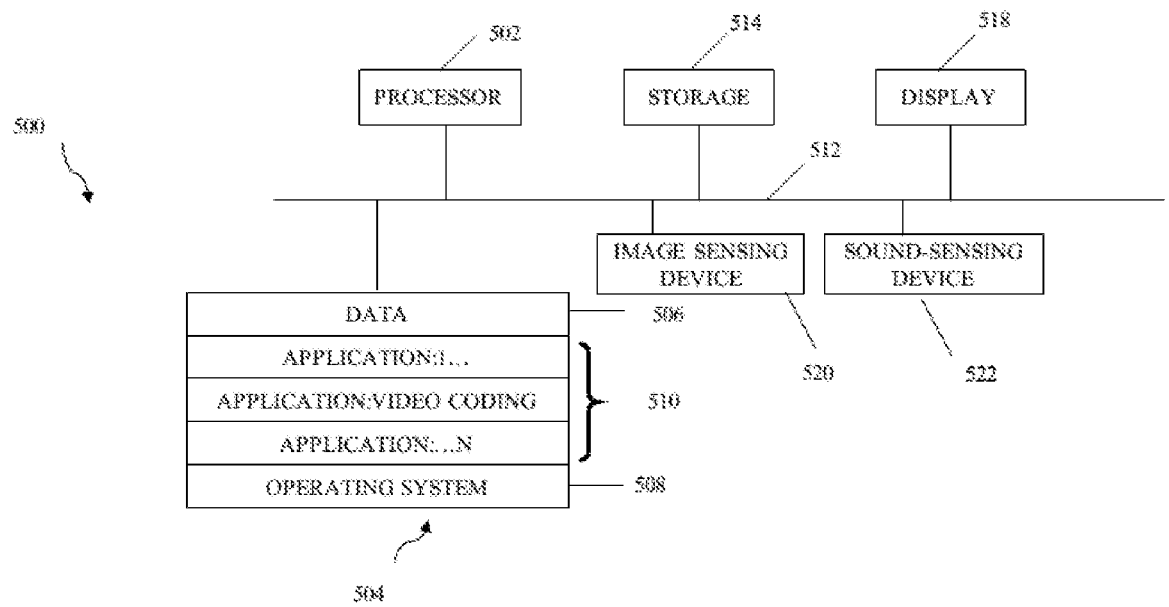
FIG. 5 is a block diagram illustrating another example of an encoding apparatus or a decoding apparatus.

FIG. 5 is a simplified block diagram of an apparatus 500 that may be used as either or both of the source device 310 and the destination device 320 from FIG. 1 according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In VVC, motion vectors of inter-coded blocks can be signaled in two ways: Advanced motion vector prediction (AMVP) mode or merge mode. With AVMP mode, a difference between the real motion vector and a motion vector prediction (MVP), a reference index and a MVP index referring to an AMVP candidate list are signaled, where the reference index points to the reference picture where the reference block is copied from for the motion compensation. For the merge mode, a merge index referring to a merge candidate list is signaled and all the motion information associated with the merge candidate is inherited.

Figure 6:
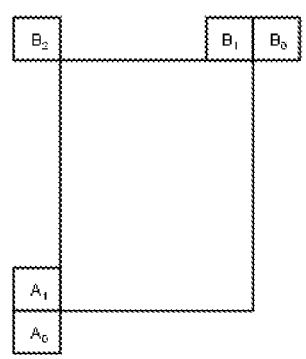
FIG. 6 shows positions of spatial neighboring blocks used in merge and AMVP candidate list construction.

For both the AMVP candidate list and the merge candidate list, they are derived from temporally or spatially neighboring coded blocks. More specifically, the merge candidate list is constructed by checking the following four types of merge MVP candidates in order:
 1. Spatial merge candidates, which may be determined from five spatial neighboring blocks as depicted in FIG. 6, that is, blocks A0 and A1 which are located at the left bottom corner, Blocks B0 and B1 located at the right top corner, and Block B2 located at the left top corner.
 2. Temporal MVP (TMVP) merge candidate.
 3. Combined bi-predictive merging candidates.
 4. Zero motion vector merging candidates.

Once the number of available merge candidates reaches the signaled maximally allowed merge candidates (e.g., 5 in common test conditions), the merge candidate list construction process is terminated. It should be noted that, the maximally allowed merge candidates may be different in different conditions.

Similarly, for the AMVP candidate list, three types of MVP candidates are checked in order:
 1. Up to two spatial MVP candidates, where one of the two is determined from blocks $B_0$, $B_1$, and $B_2$ as depicted in FIG. 6, and the other one of the two is determined from blocks $A_0$ and $A_1$ as depicted in FIG. 6.
 2. Temporal MVP (TMVP) candidates.
 3. Zero MVP candidates.

Figure 7:
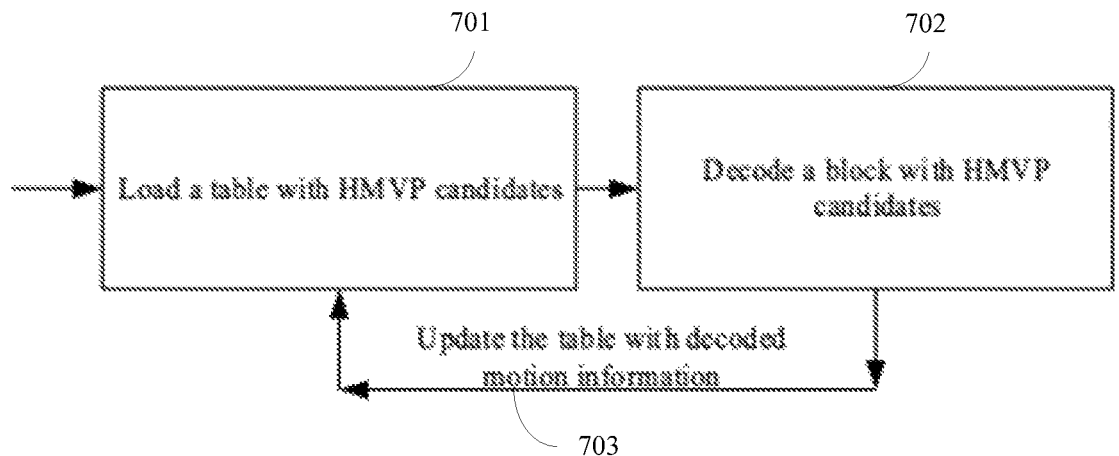
FIG. 7 is decoding flow chart of an HMVP method.

A history-based Motion Vector Prediction (HMVP) method is introduced by JVET-K0104, which is an input document to Joint Video Experts Team (JVET) of ITU-T SG 16 WP 3 and ISO/IEC JTC 1/SC 29/WG 11 (Accessible at http://phenix.it-sudparis.eu/jvet/), where a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 7, which includes:
 Step 701. loading a table with HMVP candidates;
 Step 702, decoding a block with the HMVP candidates in the loaded table;
 Step 703, updating the table with the decoded motion information when decoding the block.
 Steps 701-703 may be performed circularly.

HMVP candidates could be used in the merge candidate list construction process. All HMVP candidates from the last entry to the first entry in the table are inserted after the TMVP candidate. Pruning may be applied on the HMVP candidates. Once the total number of available merge candidates reaches the signaled maximally allowed merge candidates, the merge candidate list construction process is terminated.

The operation of pruning stands for identifying identical motion predictor candidates in a list and removing one of the identical candidates from the list.

Similarly, HMVP candidates could also be used in the AMVP candidate list construction process. The motion vectors of the last K HMVP candidates in the table are inserted after the TMVP candidate. In some implementation manners, only HMVP candidates with the same reference picture as the AMVP target reference picture are used to construct the AMVP candidate list. Pruning may be applied on the HMVP candidates.

In order to improve the processing efficiency, a processing called wavefront parallel processing (WPP) is introduced, where WPP mode allows rows of CTUs to be processed in parallel. In WPP mode each CTU row is processed relative to its preceding (immediately adjacent) CTU row by using a delay of two consecutive CTUs. For example, see FIG. 8, a picture frame or picture area is consist of a plurality CTU rows, each thread (row) includes 11 CTUs, i.e., thread 1 includes CTU0 to CTU10, thread 2 includes CTU11 to CTU 21, thread 3 includes CTU22 to CTU32, thread 4 includes CTU33 TO 43 . . . . Therefore, in WPP mode, when the encoding/decoding process of CTU1 in thread 1 is finished, the encoding/decoding process of CTU11 in thread 2 can start, similarly, when the encoding/decoding process of CTU12 in thread 2 is finished, the encoding/decoding process of CTU22 in thread 3 can start, when the encoding/decoding process of CTU23 in thread 3 is finished, the encoding/decoding process of CTU33 in thread 4 can start, when the encoding/decoding process of CTU34 in thread 4 is finished, the encoding/decoding process of CTU44 in thread 5 can start.

However, when combining WPP with HMVP, as stated above, an HMVP list is maintained and updated after processing of each coding block, thus one HMVP list is maintained that keeps getting updated till the last CTU of a CTU row, therefore the wavefront parallel processing cannot be performed since the Thread-N needs to wait for the processing of the last CTU in the above CTU row to finish.

Figure 9:
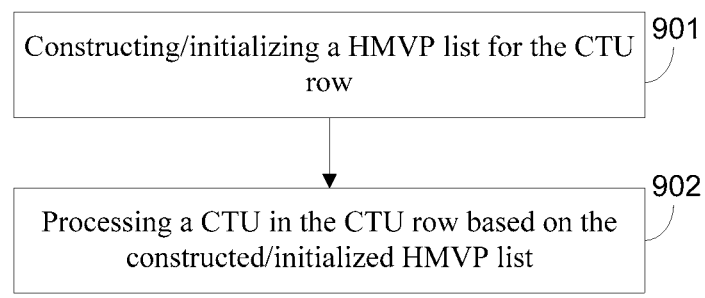
FIG. 9 is a flowchart illustrating an example operation of a video decoder according to an embodiment.

FIG. 9 is a flowchart illustrating an example operation of a video decoder, such as video decoder 30 of FIG. 3 in accordance with an embodiment of the present application. One or more structural elements of video decoder 30, including inter prediction unit 344, may be configured to perform the techniques of FIG. 9. In the example of FIG. 9, the video decoder 30 may performing the following steps:

901. At the beginning of processing of a CTU row, constructing/initializing a HMVP list for the CTU row is performed.

When a to be processed CTU is the first CTU (beginning CTU) of a CTU row, the HMVP list for the CTU row is constructed or initialized, thus the first CTU of the CTU row can be processed based on the HMVP list for the CTU row.

The HMVP list for the CTU row may be constructed or initialized by the inter prediction unit 344 of FIG. 3 when the method is an encoding method. Alternatively, the HMVP list for the CTU row may be constructed or initialized by the inter prediction unit 244 of FIG. 2 when the method is a decoding method.

In an implementation manner, for a picture frame, every CTU row may be maintained with a different HMVP list. In another implementation manner, for a picture area, every CTU row may be maintained with a different HMVP list, where the picture area may have a plurality of CTU rows, where the picture may be a slice, a tile, or a brick of VVC.

Where the brick is a rectangular region of CTU rows within a particular tile in a picture, a tile may be partitioned into multiple bricks, each of which consisting of one or more CTU rows within the tile. A tile that is not partitioned into multiple bricks is also referred to as a brick. However, a brick that is a true subset of a tile is not referred to as a tile.

It should be noted that, maintaining a different HMVP list for every CTU row only means that a specific HMVP list may be maintained for a CTU row, but the candidates in different HMVP lists may be the same, e.g., all the candidates in one HMVP list are the same with the candidates in another HMVP list, it should be noted that, candidates in one HMVP list may not have redundancy; or the candidates in different HMVP lists may be have overlap, e.g., some of the candidates in one HMVP list are the same with the some of the candidates in another HMVP list, and some of the candidates in the one HMVP list may not have identical ones in the another HMVP list; or the candidates in different HMVP lists may be totally different, e.g., none of the candidates in one HMVP list have an identical one in another HMVP list. It should be noted that, when all the CTUs in a CTU row have been processed, the maintained HMVP list for the CTU row can be released for storage reduction.

The present disclosure provided the following manners to construct/initialize the HMVP list:

Manner 1: At the beginning of processing of a CTU row, the corresponding HMVP list is emptied or set to default values. The default values are predetermined candidate that are known to both encoder and the decoder.

For example, the corresponding HMVP list is populated with default MVs such as:
  a) The MVs from Uni Prediction manner, where an MV may be a zero motion vector, and the reference pictures may include the first reference picture in L0 list; and/or
  b) The MVs from Bi-prediction manner, where a MV may be a zero motion vector, and the reference pictures may include the first reference picture in L0 list and the first reference picture in L1 list; and/or
  c) The MVs of a previously processed picture according to picture processing order. More specifically MVs that belong to a previously processed picture and that are in spatial vicinity of the current block, when the current block position is overlaid on the previous picture. and/or
  d) The MVs of a Temporal HMVP list, where each co-located picture may store an Temporal HMVP list for each CTU row or for the whole picture, thus the temporal HMVP list can be used to construct/initialize the HMVP list for the current CTU row.

Manner 2: At the beginning of processing of a current CTU row, the corresponding HMVP list is constructed/initialized based on the HMVP list of second CTU of the previous CTU row, where the previous CTU row is the CTU row immediately adjacent to the current CTU row and on the top of the current CTU row.

Figure 8:
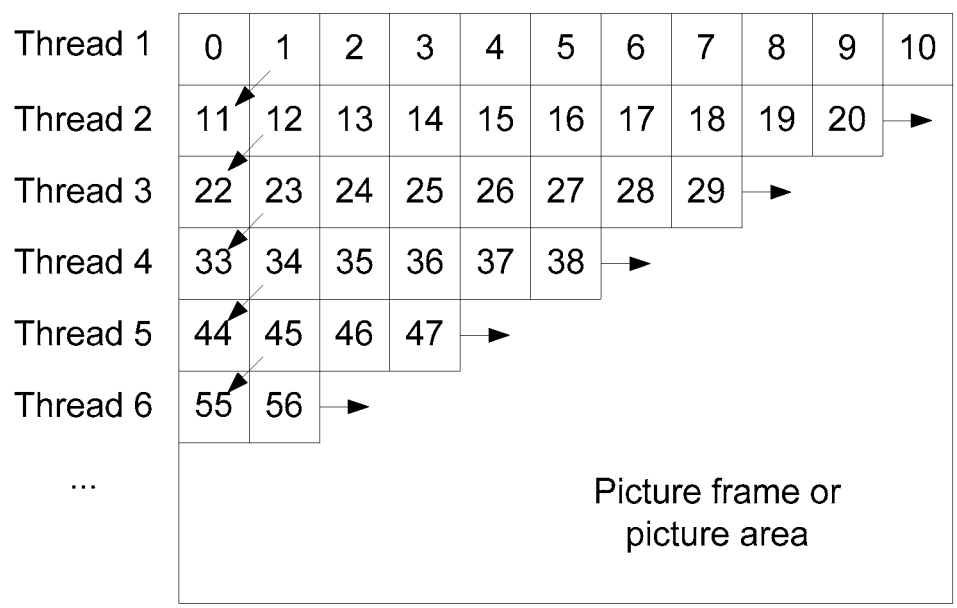
FIG. 8 is a block diagram illustrating a WPP processing order.

Take FIG. 8 as an example, where when the current CTU row is the CTU row of thread 2, the previous CTU row is the CTU row of thread 1, and the second CTU of the previous row is CTU1; when the current CTU row is the CTU row of thread 3, the previous CTU row is the CTU row of thread 2, and the second CTU of the previous row is CTU12; when the current CTU row is the CTU row of thread 4, the previous CTU row is the CTU row of thread 3, and the second CTU of the previous row is CTU23; when the current CTU row is the CTU row of thread 5, the previous CTU row is the CTU row of thread 4, and the second CTU of the previous row is CTU34; when the current CTU row is the CTU row of thread 6, the previous CTU row is the CTU row of thread 5, and the second CTU of the previous row is CTU45.

Manner 3: At the beginning of processing of a current CTU row, the corresponding HMVP list is constructed/initialized based on the HMVP list of first CTU of the previous CTU row, where the previous CTU row is the CTU row immediately adjacent to the current CTU row and on the top of the current CTU row.

Take FIG. 8 as an example, where when the current CTU row is the CTU row of thread 2, the previous CTU row is the CTU row of thread 1, and the first CTU of the previous row is CTU0; when the current CTU row is the CTU row of thread 3, the previous CTU row is the CTU row of thread 2, and the first CTU of the previous row is CTU11; when the current CTU row is the CTU row of thread 4, the previous CTU row is the CTU row of thread 3, and the first CTU of the previous row is CTU22; when the current CTU row is the CTU row of thread 5, the previous CTU row is the CTU row of thread 4, and the first CTU of the previous row is CTU33; when the current CTU row is the CTU row of thread 6, the previous CTU row is the CTU row of thread 5, and the first CTU of the previous row is CTU44.

According to manners 1 to 3, the processing of the current CTU row do not need to wait the processing of a previous CTU row of the current CTU row being finished, thus can improve the processing efficiency of the current picture frame.

902. Processing a CTU in the CTU row based on the constructed/initialized HMVP list.

The processing of the CTU may be an inter-prediction processing which performed during decoding process, that is, the processing of the CTU may be implemented by the inter prediction unit 344 of FIG. 3. Alternatively, The processing of the CTU may be an inter-prediction processing which performed during encoding process, that is, the processing of the CTU may be implemented by the inter prediction unit 244 of FIG. 2.

It should be noted that, the above manners for constructing/initializing the HMVP list may also be used for normal HMVP processing without wave fronts, e.g., HMVP processing without WPP. As a result HMVP processing is identical irrespective of the application of WPP, which reduces necessity of additional logic implementation.

It should be noted that, the processing of FIG. 9 may be also an encoding process implemented by an encoder, such as the video encoder 20 of FIG. 2 in accordance with an embodiment of the present application.

Further, it is should be noted that, the above mentioned methods concerning the combination of wavefronts and HMVP based prediction may also be used for intra prediction. That is, historical intra modes can be used, and the historical table for each CTU row is initialized to default values.

For example, the initialization of the HMVP list for each CTU row in intra prediction can be done with default intra modes like, Planar, DC, Vertical, Horizontal, Mode 2, VDIA and DIA modes.

Figure 10:
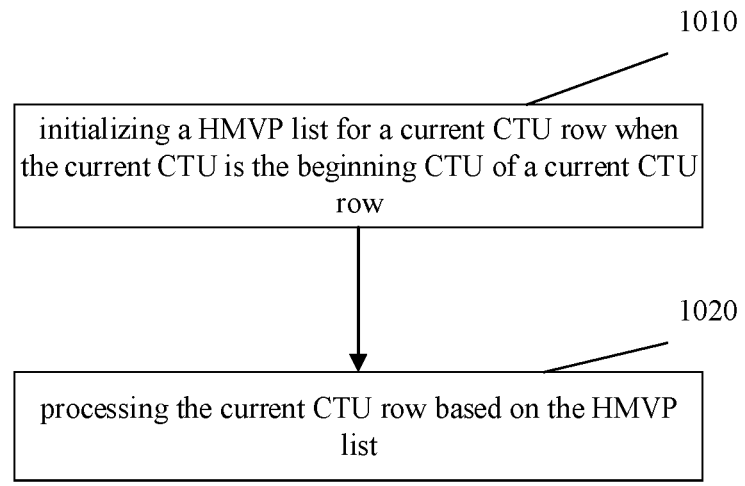
FIG. 10 is a flowchart illustrating an example operation according to an embodiment.

FIG. 10 is a flowchart illustrating an example operation of a video decoder or a video encoder, such as video decoder 30 of FIG. 3 in accordance with an embodiment of the present application and video encoder 20 of FIG. 2 in accordance with an embodiment of the present application. One or more structural elements of video decoder 30/encoder 20, including inter prediction unit 344/inter prediction unit 244, may be configured to perform the techniques of FIG. 10. In the example of FIG. 10, the video decoder 30/video encoder 20 may performing the following steps:

Step 1010, initializing a HMVP list for a current CTU row when the current CTU is the beginning CTU of a current CTU row.

It should be noted that, the current CTU row may be any CTU row of a picture frame consists of a plurality of CTU rows or a picture area (may be a part of a picture frame) consists of a plurality of CTU rows. And the current CTU row can be any one of the plurality of CTU rows.

Whether the current CTU is the beginning CTU (or the first CTU) of the current CTU row may be determined based on the index of the current CTU. For example, as disclosed in FIG. 8, each CTU has a unique index, thus can determine whether the current CTU is the first CTU of the current CTU row based on the index of the current CTU. For example, the CTUs with the index of 0, 11, 22, 33, 44, or 55 . . . are the first CTU of CTU rows respectively. Alternatively, take FIG. 8 as an example, each CTU row includes 11 CTUs, that is, the width of each CTU row is 11, thus can use the width of the CTU row to divide the index of a CTU to determine whether the remainder is 0 or not, if the remainder is 0, the corresponding CTU is the first CTU of a CTU row; otherwise, if the remainder is not 0, the corresponding CTU is not the first CTU of a CTU row. That is, if the index of a CTU % the width of a CTU row=0, the CTU is the first CTU of the CTU row; otherwise, if the index of a CTU % the width of a CTU row≠0, the CTU is not the first CTU of the CTU row. It should be noted that, when the process of a CTU row is from right to left, whether a CTU is the beginning CTU of a CTU row may be determined in similar way.

After the initializing of the HMVP list, the quantity of the candidate motion vectors in the initialized HMVP list is zero.

The initializing may be performed as emptying the HMVP list for the current CTU row, that is, make the HMVP list for the current CTU row empty, in other words, the number of candidates in the HMVP list for the current CTU row is zero.

In another implementation manner, the method may further includes the following step: initializing a HMVP list for each of the plurality of CTU rows except the current CTU row, wherein HMVP lists for the plurality of CTU rows are identical or different.

The initializing may be performed as setting default values for the HMVP list for the current CTU row, or initializing the HMVP list for the current CTU row based on a HMVP list of a CTU of a previous CTU row as described above.

Step 1020, processing the current CTU row based on the HMVP list.

The processing may be an inter prediction process, thus a prediction block can be obtained. A reconstruction can be performed based on the prediction block to obtain a reconstructed block, finally a decoded picture can be obtained based on the reconstructed block. The details of these processes are described above.

As shown in FIG. 8, the current picture frame comprises a plurality of CTU rows, in order to improve the coding/decoding efficiency, the plurality of CTU rows can be processed in wavefront parallel processing (WPP) mode. That is, the current CTU row begins to be processed (or the processing of the current CTU row begins) when a particular CTU of a previous CTU row is processed, where the previous CTU row is the CTU row immediately adjacent to the current CTU row and on the top of the current CTU row, where the particular CTU of the previous CTU row is the second CTU of the previous CTU row; or the particular CTU of the previous CTU row is the first CTU of the previous CTU row. Take FIG. 8 for an example, when the current CTU row is thread 3, the previous CTU row is thread 2, the particular CTU of the previous CTU row may be CTU 12, that is, when the CTU 12 is processed, the decoder/encoder begins to process the CTU row of thread 3, i.e., the decoder/encoder begins to process CTU 22. Take FIG. 8 for another example, when the current CTU row is thread 4, the previous CTU row is thread 3, the particular CTU of the previous CTU row may be CTU 23, that is, when the CTU 23 is processed, the decoder/encoder begins to process the CTU row of thread 4, i.e., the decoder/encoder begins to process CTU 33.

In one implementation manner, the processing the current CTU row based on the HMVP list may include: processing the current CTU of the current CTU row; updating the initialized HMVP list based on the processed current CTU; and processing the second CTU of the current CTU row based on the updated HMVP list.

Figure 11:
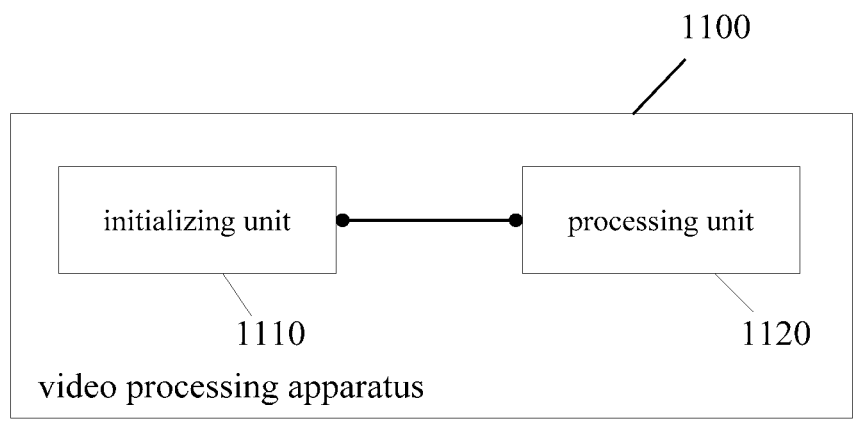
FIG. 11 is a block diagram illustrating an example of a video processing apparatus.

FIG. 11 is a block diagram showing an example of a video processing apparatus 1100 configured to implement embodiments of the invention, the video processing apparatus 1100 may be the encoder 20 or the decoder 30, as shown in FIG. 11, the apparatus includes:

An initializing unit 1110, configured to initialize a HMVP list for a current CTU row when the current CTU is the beginning CTU (the first CTU) of a current CTU row.

The detail of the initialization performed by the initializing unit 1110 can reference to step 1010.

A processing unit 1120, configured to process the current CTU row based on the HMVP list.

The detail of the processing performed by the processing unit 1120 can reference to step 1020.

The processing may be an inter prediction process, thus a prediction block can be obtained. A reconstruction can be performed based on the prediction block to obtain a reconstructed block, finally a decoded picture can be obtained based on the reconstructed block. The details of these processes are described above.

As shown in FIG. 8, the current picture frame comprises a plurality of CTU rows, in order to improve the coding/decoding efficiency, the plurality of CTU rows can be processed in WPP mode. That is, the current CTU row begins to be processed when a particular CTU of a previous CTU row is processed, where the previous CTU row is the CTU row immediately adjacent to the current CTU row and on the top of the current CTU row, where the particular CTU of the previous CTU row is the second CTU of the previous CTU row; or the particular CTU of the previous CTU row is the first CTU of the previous CTU row. Take FIG. 8 for an example, when the current CTU row is thread 3, the previous CTU row is thread 2, the particular CTU of the previous CTU row may be CTU 12, that is, when the CTU 12 is processed, the decoder/encoder begins to process the CTU row of thread 3, i.e., the decoder/encoder begins to process CTU 22. Take FIG. 8 for another example, when the current CTU row is thread 4, the previous CTU row is thread 3, the particular CTU of the previous CTU row may be CTU 23, that is, when the CTU 23 is processed, the decoder/encoder begins to process the CTU row of thread 4, i.e., the decoder/encoder begins to process CTU 33.

The present disclosure further discloses an encoder, which includes processing circuitry for carrying out the video processing method or the method of coding of the present disclosure.

The present disclosure further discloses a decoder, which includes processing circuitry for carrying out the video processing method or the method of coding of the present disclosure.

The present disclosure further discloses computer program product which comprising a program code for performing the video processing method or the method of coding of the present disclosure.

The present disclosure further discloses a computer-readable storage medium storing computer instructions, that when executed by one or more processors, cause the one or more processors to perform the video processing method or the method of coding of the present disclosure. The computer-readable storage medium is non-transitory or transitory.

The present disclosure further discloses a decoder, comprising one or more processors; and a non-transitory computer-readable storage medium coupled to the processors and storing programming for execution by the processors, wherein the programming, when executed by the processors, configures the decoder to carry out the video processing method or the method of coding of the present disclosure.

The present disclosure further discloses an encoder, comprising one or more processors; and a non-transitory computer-readable storage medium coupled to the processors and storing programming for execution by the processors, wherein the programming, when executed by the processors, configures the encoder to carry out the video processing method or the method of coding of the present disclosure.

The initializing process for the HMVP list is described in general slice data syntax of VVC (Joint Video Experts Team (JVET) of ITU-T SG 16 WP 3 and ISO/IEC JTC 1/SC 29/WG 11, Versatile Video Coding (Draft 6)), section 7.3.8.1 of VVC recites:

|  | Descriptor |
|---|---|
| ```
slice_data( ) {
    for( i = 0; i < NumBricksInCurrSlice; i++ ) {
        CtbAddrInBs = FirstCtbAddrBs[ SliceBrickIdx[ i ] ]
        for( j = 0; j < NumCtusInBrick[ SliceBrickIdx[ i ] ]; j++, CtbAddrInBs++ ) {
            if( ( j % BrickWidth[ SliceBrickIdx[ i ] ] ) = = 0 ) {
                NumHmvpCand = 0
                NumHmvpIbcCand = 0
                ResetIbcBuf = 1
            }
            CtbAddrInRs = CtbAddrBsToRs[ CtbAddrInBs ]
            coding_tree_unit( )
            if( entropy_coding_sync_enabled_flag &&
``` | |

| | Descriptor |
|---|---|
|             ( j < NumCtusInBrick[ SliceBrickIdx[ i ] ] − 1 ) && | |
|             ( (j + 1 ) % BrickWidth[ SliceBrickIdx[ i ] ] = = 0 ) ) { | |
|           end_of_subset_one_bit /* equal to 1 */ | ae(v) |
|           byte_alignment( ) | |
|         } | |
|       } | |
|     end_of_brick_one_bit /* equal to 1 */ | ae(v) |
|     if( i < NumBricksInCurrSlice − 1 ) | |
|       byte_alignment( ) | |
|   } | |
| } | |

Where j % BrickWidth[SliceBrickIdx[i]])==0 means that the CTU with the index j is the beginning CTU of a CTU row, and NumHmvpCand=0 means that the quantity of candidates in the HMVP list is set to 0, in other words, the HMVP list is emptied.

The updating process for the HMVP list is described in section 8.5.2.16 of VVC (Joint Video Experts Team (JVET) of ITU-T SG 16 WP 3 and ISO/IEC JTC 1/SC 29/WG 11, Versatile Video Coding (Draft 6)), which recites:

Inputs to this process are:

luma motion vectors in 1/16 fractional-sample accuracy mvL0 and mvL1, reference indices refIdxL0 and refIdxL1, prediction list utilization flags predFlagL0 and predFlagL1, bi-prediction weight index bcwIdx.

The MVP candidate hMvpCand consists of the luma motion vectors mvL0 and mvL1, the reference indices refIdxL0 and refIdxL1, the prediction list utilization flags predFlagL0 and predFlagL1, and the bi-prediction weight index bcwIdx.

The candidate list HmvpCandList is modified using the candidate hMvpCand by the following ordered steps:

The variable identicalCandExist is set equal to FALSE and the variable removeIdx is set equal to 0.

When NumHmvpCand is greater than 0, for each index hMvpIdx with hMvpIdx=0 . . . NumHmvpCand−1, the following steps apply until identicalCandExist is equal to TRUE:

When hMvpCand is equal to HmvpCandList[hMvpIdx], identicalCandExist is set equal to TRUE and removeIdx is set equal to hMvpIdx.

The candidate list HmvpCandList is updated as follows:

If identicalCandExist is equal to TRUE or NumHmvpCand is equal to 5, the following applies:

For each index i with i=(removeIdx+1) . . . (NumHmvpCand−1), HmvpCandList[i−1] is set equal to HmvpCandList[i].

HmvpCandList[NumHmvpCand−1] is set equal to mvCand.

Otherwise (identicalCandExist is equal to FALSE and NumHmvpCand is less than 5), the following applies:

HmvpCandList[NumHmvpCand++] is set equal to mvCand.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A video processing method, comprising:
at the beginning of processing each coding tree unit (CTU) row of a picture area that consists of a plurality of CTU rows, initializing a history-based motion vector prediction (HMVP) list for each of the plurality of CTU rows, wherein a quantity of candidate motion vectors in each of the initialized HMVP lists is zero, wherein the picture area is a tile and a beginning CTU of each of the CTU rows is located at the left boundary of the tile; and
processing the plurality of CTU rows based on the initialized HMVP lists.

2. The method according to claim 1, wherein the processing of the plurality of CTU rows based on the initialized HMVP lists further comprises:
processing a current CTU of the current CTU row;
updating a respective HMVP list based on the processed current CTU; and
processing a second CTU of the current CTU row based on the updated HMVP list.

3. The method according to claim 1, wherein
the HMVP list of a current CTU row of the plurality of CTU rows is updated according to a processed CTU of the current CTU row.

4. The method according to claim 1, wherein the HMVP list for a current CTU row of the plurality of CTU rows is initialized as follows:
emptying the HMVP list for the current CTU row.

5. The method according to claim 1, wherein the plurality of CTU rows are processed in a wavefront parallel processing (WPP) mode.

6. The method according to claim 2, wherein the processing of the current CTU of the current CTU row begins when a particular CTU of a previous CTU row is processed.

7. The method according to claim 6, wherein the previous CTU row is the CTU row immediately adjacent to the current CTU row and on top of the current CTU row.

8. The method according to claim 6, wherein the particular CTU of the previous CTU row is the second CTU of the previous CTU row;
or
the particular CTU of the previous CTU row is the first CTU of the previous CTU row.

9. A video processing apparatus, comprising:
an initializing unit configured to, at the beginning of processing each coding tree unit (CTU) row of a picture area that consists of a plurality of CTU rows, initialize a history-based motion vector prediction (HMVP) list for each of the plurality of CTU rows, wherein a quantity of candidate motion vectors in each of the initialized HMVP lists is zero, wherein the picture area is a tile and a beginning CTU of each of the CTU rows is located at the left boundary of the tile; and
a processing unit, configured to process the plurality of CTU rows based on the initialized HMVP lists.

10. The apparatus according to claim 9, wherein the initializing unit is further configured to process the plurality of CTU rows based on the initialized HMVP lists as follows:
process a current CTU of the current CTU row;
update a respective HMVP list based on the processed current CTU; and
process a second CTU of the current CTU row based on the updated HMVP list.

11. The apparatus according to claim 9, wherein the HMVP list of a current CTU row of the plurality of CTU rows is updated according to a processed CTU of the current CTU row.

12. The apparatus according to claim 9, wherein the initialized unit is further configured to initialize the HMVP list for a current CTU row of the plurality of CTU rows as following:
empty the HMVP list for the current CTU row.

13. The apparatus according to claim 9, wherein the plurality of CTU rows are processed in a wavefront parallel processing (WPP) mode.

14. The apparatus according to claim 10, wherein the processing of the current CTU of the current CTU row begins when a particular CTU of a previous CTU row is processed.

15. The apparatus according to claim 14, wherein the previous CTU row is the CTU row immediately adjacent to the current CTU row and on top of the current CTU row.

16. The apparatus according to claim 14, wherein the particular CTU of the previous CTU row is the second CTU of the previous CTU row;
or
the particular CTU of the previous CTU row is the first CTU of the previous CTU row.

* * * * *